No. 774,224.

Patented November 8, 1904.

UNITED STATES PATENT OFFICE.

HUGO WINTERNITZ, OF HALLE-ON-THE-SAALE, GERMANY, ASSIGNOR TO THE FIRM OF E. MERCK, OF DARMSTADT, GERMANY.

SOLIDIFIED HALOGENIZED FAT AND PROCESS OF MAKING SAME.

SPECIFICATION forming part of Letters Patent No. 774,224, dated November 8, 1904.

Application filed June 30, 1903. Serial No. 163,725. (No specimens.)

*To all whom it may concern:*

Be it known that I, HUGO WINTERNITZ, a subject of the Emperor of Austria-Hungary, residing at Halle-on-the-Saale, Germany, have invented certain new and useful Improvements in Solidified Halogenized Fats and Processes of Making Same, of which the following is a clear, full, and exact description.

My invention relates to a new product—viz., solidified halogenized fats—and also to a process of producing the same.

My invention will be defined in the claims.

The iodized and brominized fats prepared and introduced by me which have been the object of physiological study and for which the German Empire has issued a patent bearing the number 96,495 have since their introduction acquired great importance in therapy, and this is more particularly the case in regard to the iodized sesame-oil and brominized sesame-oil. The internal administration of these remedies has, however, been greatly hampered heretofore because of their oily character and incident oleaginous taste. Therefore to prepare the halogenized—and by this I mean only the iodized or brominized—fats in a solid, which may be a pulverulent form and without any loss of the specific virtues which render the preparations so valuable, must be regarded as a praiseworthy task. This task or object has been accomplished by evaporating, preferably in a vacuum, the emulsion resulting from the mixture of such a halogenized fat with concentrated milk, or, instead of the latter, mixing the chief constituents of milk—for example, casein or salts of casein and milk-sugar—with the fat and then reducing the mixture to dryness, preferably by evaporating it in a vacuum. By "casein" I also include compositions containing casein and such substances (an alkali, for example) which render the casein more soluble. By "fat" I mean to include the word "oil," and do not limit myself to any particular class of fats or oils, and by "pulverulent" I merely mean that the substance is in separated particles.

Example 1: Skim-milk is evaporated in a vacuum to a thick syrupy consistency and mixed with an iodized fat, preferably iodized sesame-oil (one liter of skim-milk to from fifty to one hundred grams of iodized oil) to form an emulsion. On evaporating to dryness in a vacuum the emulsion so obtained there results an agreeably-tasting powder which contains at least fifty per cent. of iodized sesame-oil. It will be observed that in this example the casein is not precipitated from the milk, but is present in the product resulting from the evaporation of the skim-milk.

Example 2: The casein precipitated from one liter of skim-milk is expressed until the residue contains about thirty per cent. of dry substance. To the press-cake so obtained a sufficient quantity of an alkali is added to bring it to a creamy consistency, for which purpose, for instance, about five cubic centimeters of a ten per cent. solution of sodium carbonate suffices. Forty grams of milk-sugar are now added and stirred into the mass obtained, as above described, and the resulting pasty mass is then emulsionized with eighty grams of brominized fat—*e. g.*, sesame-oil. This mass is then evaporated to dryness at a low temperature in a vacuum.

Example 3: Twenty grams of a casein salt containing casein and an alkali (soda, for example) are triturated with thirty grams of milk-sugar, the mixture moistened by the addition of thirty grams of water, and the resulting paste emulsionized with forty-five grams of iodized sesame-oil. The emulsion so obtained is then evaporated to dryness in a vacuum by the air or warmth.

These brominized fats may be used as a sedative and anti-epileptic, and the dose may be from one to four teaspoonfuls, according to the amount of bromin desired to be administered. The iodized fats may be used as an antisyphilitic and alterative, the dose being similarly varied according to the amount of iodin to be administered.

The foregoing shows examples of my process and also of products resulting from my process; but I do not limit myself to the particular oils or fats specified, as I am aware that many variations from the examples set forth can be made without departing from my invention as claimed.

What I claim is—

1. A substance in the form of a solidified fat, said substance containing a halogenized fat and casein.

2. A substance in the form of a solidified fat, said substance containing a halogenized vegetable fat and casein.

3. A substance in the form of a solidified fat, said substance containing brominized sesame-oil and casein.

4. A substance in the form of a solidified fat, said substance containing a halogenized fat, casein and sugar of milk.

5. A substance in the form of a solidified fat, said substance containing a brominized vegetable oil, casein and sugar of milk.

6. The process of preparing a solidified halogenized fat which consists in emulsifying a halogenized fat with casein, and evaporating the emulsion to a solid form.

7. The process of preparing a solidified halogenized fat which consists in emulsifying a halogenized fat with casein and milk-sugar and evaporating the emulsion to a solid form.

8. The process of preparing a solidified halogenized fat which consists in emulsifying a brominized fat with casein and evaporating the emulsion to a solid form.

9. The process of preparing a solidified halogenized fat which consists in emulsifying a halogenized fat with casein and reducing the emulsion to a solid form.

10. The process of preparing a solidified brominized fat, which consists in emulsifying a brominized sesame-oil with casein and reducing the emulsion to a solid form.

Signed at Leipzig, Germany, this 13th day of June, 1903.

HUGO WINTERNITZ.

Witnesses:
RUDOLPH FRICKE,
P. V. V. DUNN.